US012572274B2

(12) United States Patent
Huang et al.

(10) Patent No.: US 12,572,274 B2
(45) Date of Patent: Mar. 10, 2026

(54) EXTERNAL STORAGE ACCESS MODE

(71) Applicant: Hewlett-Packard Development Company, L.P., Spring, TX (US)

(72) Inventors: Tsue-Yi Huang, Taipei (TW); Chia-Cheng Lin, Taipei (TW); Thong Thai, Spring, TX (US); Chao-Shen Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/696,867

(22) PCT Filed: Oct. 29, 2021

(86) PCT No.: PCT/US2021/057345
§ 371 (c)(1),
(2) Date: Mar. 28, 2024

(87) PCT Pub. No.: WO2023/075793
PCT Pub. Date: May 4, 2023

(65) Prior Publication Data
US 2025/0036279 A1      Jan. 30, 2025

(51) Int. Cl.
G06F 3/06 (2006.01)
(52) U.S. Cl.
CPC .......... G06F 3/0604 (2013.01); G06F 3/0634 (2013.01); G06F 3/0673 (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88;
(Continued)

(56) References Cited

U.S. PATENT DOCUMENTS

2007/0106830 A1*   5/2007   Ari .......................... G06F 1/266
                                                                710/316
2015/0331476 A1*   11/2015  Slik ....................... G06F 1/3209
                                                                713/324
(Continued)

FOREIGN PATENT DOCUMENTS

WO      WO-2019216902 A1 *   11/2019   ........... G06F 1/1632

OTHER PUBLICATIONS

M. E. Kiziroglou, S. W. Wright, E. M. Yeatman and A. S. Holmes, "Dual Storage Power Management for Energy Autonomous Microsystems," in IEEE Transactions on Industrial Electronics, vol. 72, No. 8, pp. 8657-8666, Aug. 2025, doi: 10.1109/TIE.2024. 3522467. (Year: 2025).*

*Primary Examiner* — Daniel C. Chappell
(74) *Attorney, Agent, or Firm* — Quarles & Brady LLP

(57)      ABSTRACT

A target computing device includes a storage device, a target port, and firmware. The target port is connectable to a host port of a host computing device. The firmware is to operate the target computing device in an external storage access mode in which the storage device is externally accessible without the target computing device fully operating. The host computing device accesses via the host port the storage device as an external storage device.

19 Claims, 5 Drawing Sheets

(58) Field of Classification Search
CPC .. G06F 2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56)                  References Cited

U.S. PATENT DOCUMENTS

2016/0117125 A1 *   4/2016  Starr ..................... G06F 1/3268
                                                          713/310
2019/0265897 A1 *   8/2019  Nagai ................... G11C 16/30

* cited by examiner

300

EXTERNAL STORAGE ACCESS MODE

BACKGROUND

Computing devices include computers such as desktop, laptop, and notebook computers. Computing devices typically include non-volatile storage devices such as hard disk drives and solid-state drives. A computing device may be considered as fully operating when power has been applied to the computing device and an operating system and associated applications are being executed by a central or main processor of the computing device from memory of the computing device. When the computing device is fully operating, the processor may access the storage devices in executing the operating system and the applications.

DETAILED DESCRIPTION

Figure 1:
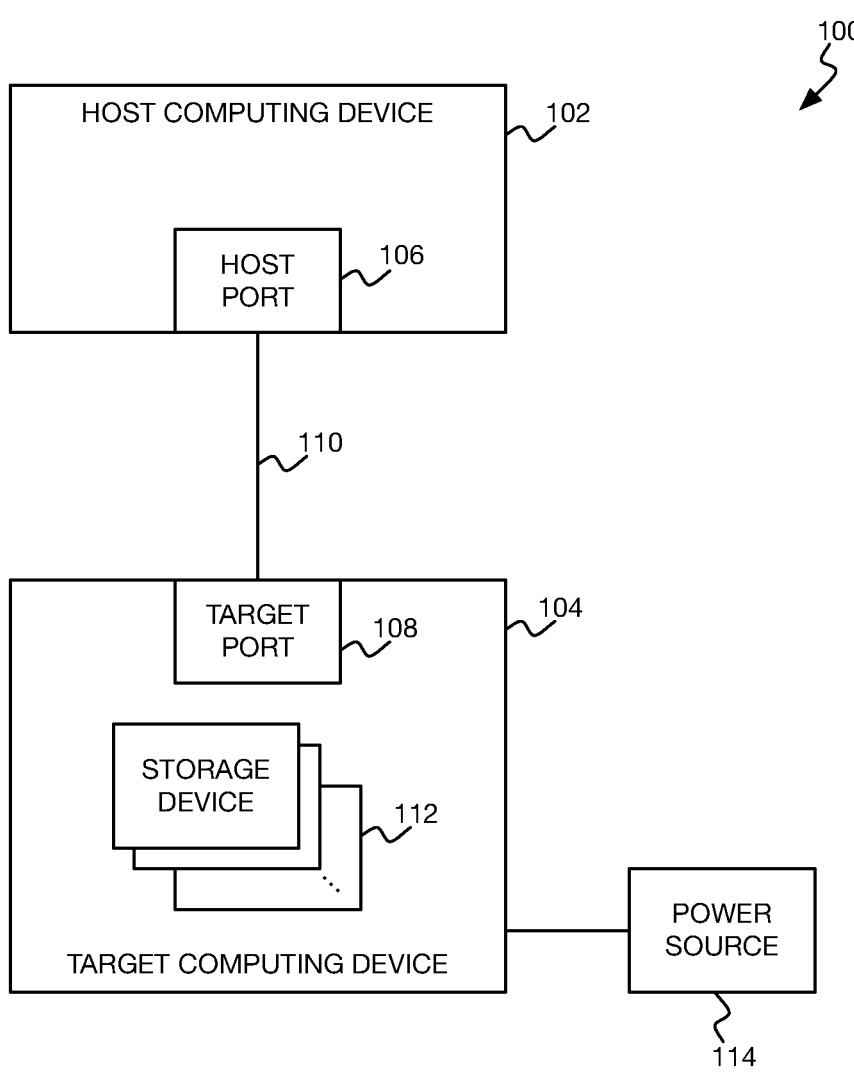
FIG. 1 is a diagram of an example system in which a host computing device accesses storage devices of a target computing device while the target computing device is not fully operating, in an external storage access mode of the target computing device.

As noted in the background, when a computing device like a computer is fully operating, the processor of the device can access storage devices of the computing device when executing the operating system and applications from memory. For example, a laptop or notebook computer may have one or multiple internal storage devices within the same housing or enclosure as other components of the computer, such as a keyboard, a touchpad, and an internal display, as well as the processor and the memory, among other components. However, when a computing device is not fully operating, the storage devices may not be accessible.

A computing device may be considered as not fully operating when the device has been powered off, such as when the operating system has been shut down and thus when no applications are able to be executed. For example, the computing device may in this case have entered what is known as a S5 sleeping state, which is equivalent to what is known as a G2 global power state in which the computing device is still connected to external or internal power. As another example, the computing device may in this case have entered what is known as a G3 global power state in which the computing device is not connected to either external or internal power.

A computing device may also be considered as not fully operating when the device has entered in a maximum power-savings state referred to as hibernation, in which the current state of the computing device is saved to a storage device and the operating system suspended before the device is powered off. For example, the computing device may in this case have entered what is known as a S4 sleeping state. In this case, too, no applications are able to be executed. When the computing device is powered back on, the operating system resumes from its suspended state, and the state of the computing device restored from that previously saved to the storage device.

A computing device may also be considered as not fully operating when the device has entered another power-savings state referred to as sleep. In this state, any internal display of the computing device may be powered off, as well as the storage devices of the computing device. For example, the computing device may in this case have entered what is known as a S3 sleeping state. The memory of the computing device may remain powered in a low-power state to maintain the current state of the computing device. When the computing device is awakened, such as by the pressing of a key on the keyboard, the usage of the touchpad, or the opening of the computing device in the case of a laptop or notebook computer, the internal display and the storage device may be powered back on and the memory returned to its regular usage state.

That the storage devices of the computing device are not accessible when the computing device is not fully operating can be inconvenient to the user. For example, a user may use a portable computer such as a notebook or laptop computer in the office or while traveling. When the user returns home, the user may wish to access the data stored on the storage devices of the computer without having to power on the computer or otherwise cause the computer to fully operate. For instance, the user may wish to access the data using his or her home computer, such as another laptop or notebook computer, a desktop computer, and so on.

Techniques described herein provide for an external storage access mode in which storage devices of a target computing device are accessible at a host computing device without the target computing device fully operating. A host port of the host computing device is connected to a target port of the target computing device, which is not currently fully operating. The host computing device detects that the target computing device is operable in the external storage access mode, such as by the target computing device informing the host computing device of this capability. The host computing device instructs the target computing device to operate in the external storage access mode. The target computing device responsively operates in the external storage access mode, and the host computing device accesses the storage devices of the target computing device via the host port, as external storage devices.

Therefore, a user can effectively use the internal storage devices of a target computing device as if they were external storage devices of a host computing device. In the aforementioned example, for instance, the user may use a portable computer such as notebook or laptop computer in the office or while traveling. When the user returns home, the user may connect the portable computer to his or her home computer, and access the storage devices of the portable computer at the home computer as external storage devices, without having to power on the portable computer in order to cause the portable computer to fully operate.

FIG. 1 shows an example system 100 including a host computing device 102 and a target computing device 104. Each of the computing devices 102 and 104 may be a computer, such as a portable computer like a laptop or notebook computer, a desktop computer, or another type of computing device. The host computing device 102 has a host port 106 and the target computing device 104 has a corresponding target port 108. Examples of the ports 106 and 108 include Universal Serial Bus (USB) Type C (USB C) ports, over which data can be communicated and over which power can be provided via USB Power Delivery (PD). The host port 106 and the target port 108 are connected to one another via a cable 110, such as a USB C cable.

The target computing device 104 includes one or multiple storage devices 112. The storage devices 112 may each be a non-volatile storage device, such as a hard disk drive or a solid-state drive. The storage devices 112 are internally accessible within the target computing device 104 in an internal storage access mode of the device 104 when the target computing device 104 is fully operating. For example, when an operating system and associated applications are currently executing on the target computing device 104, the operating system and the applications may retrieve data from and store data on the storage devices 112. The operating system and the application may themselves be stored on the storage devices 112 as program code, which is loaded into volatile memory of the target computing device 104 so that they can be executed.

When the target computing device 104 is not fully operating, the storage devices 112 are externally accessible by the host computing device 102 in an external storage access mode of the device 104. The host computing device 102 accesses the storage devices 112 at the host port 106 as external storage devices. The target computing device 104 thus provides access to the storage devices 112 at the target port 108. The host computing device 102 can therefore retrieve data from and write data to the storage devices 112 no differently than any other external storage device, such as an external hard disk drive or an external solid-state drive, which could be connected to the host port 106. The host computing device 102 may be able to boot from the storage devices 112, and therefore load the operating system and applications from the storage devices 112 into memory of the device 102 so that they can be executed on the host computing device 102.

The target computing device 104 may be connected to a power source 114, which is depicted in the example as an external power source but which instead or also may be an internal power source. An example of an external power source is a wall outlet to which the target computing device 104 is plugged into via a cable. An example of an internal power supply is a battery, which may be recharged when the target computing device 104 is connected to an external power source, or which if replaceable may be swapped out for a fresh battery after becoming depleted.

If the target computing device 104 is not connected to the power source 114, the host computing device 102 may provide power to the target computing device 104 at the host port 106, such that the device 102 receives the power at the target port 108, in order for the target computing device 104 to operate in the external storage access mode. The host computing device 102 provides such power so long as the device 102 has sufficient power reserves to provide power to the target computing device 104. The host computing device 102 may provide power to the target computing device 104 even if the device 104 is connected to the power source 114, particularly in the case in which the power source 114 is a depletable internal power source such as a battery, in order not to drain the internal power source of the device 104.

Figure 2:
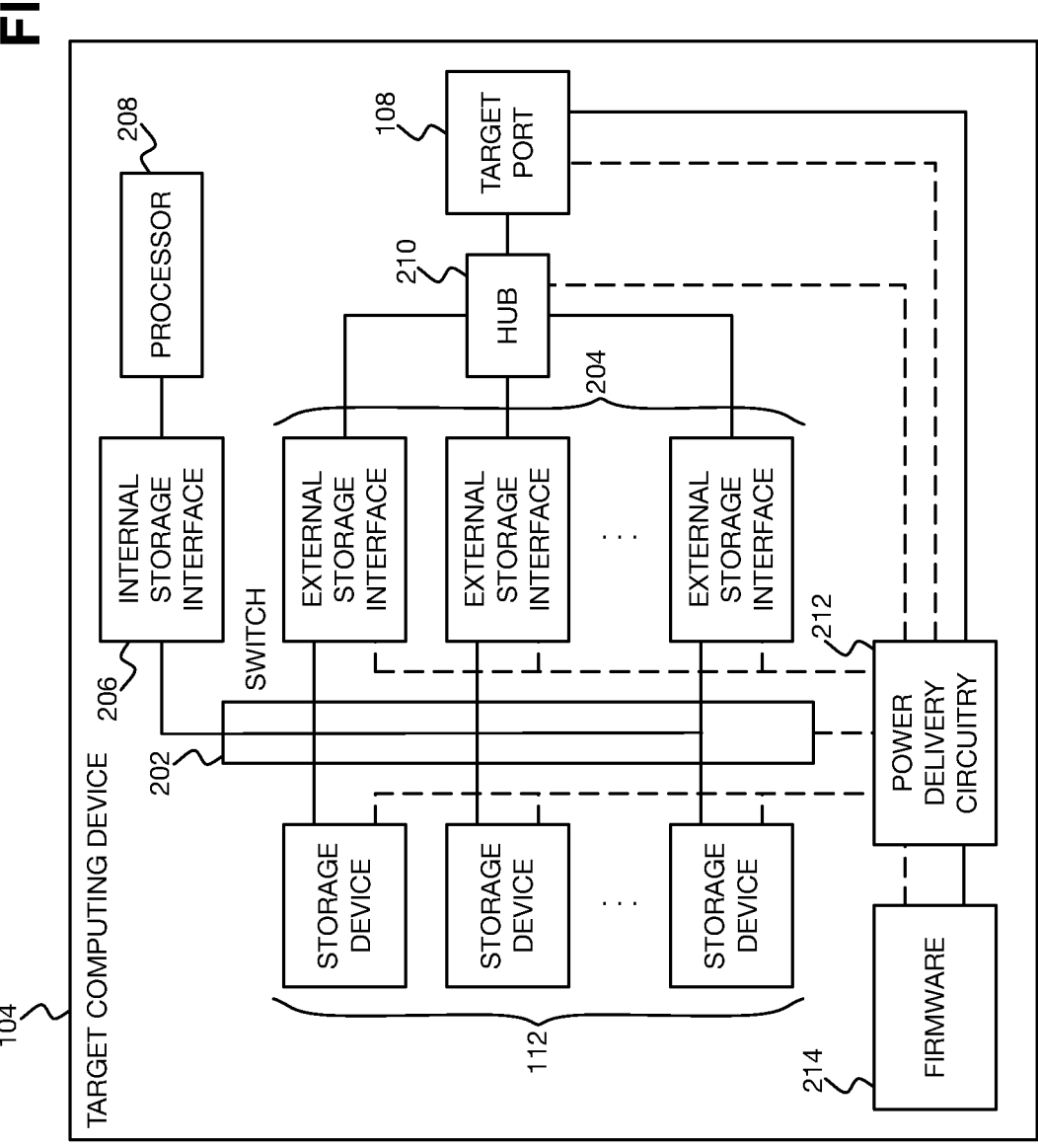
FIG. 2 is a diagram of an example of the target computing device of FIG. 1, in which the target computing device is operable in an external storage access mode in which storage devices of the target computing device are accessible by a host computing device while the target computing device is not fully operating.

FIG. 2 shows an example of the target computing device 104 in detail. The target computing device 104 again includes the target port 108 and the storage devices 112. The computing device 104 may further include other components in addition to those depicted, including volatile memory such as dynamic random-access memory (DRAM), an internal display, and so on. In FIG. 2, data connections are shown via solid lines, whereas power connections are shown via dashed lines.

The target computing device 104 includes a switch 202. The switch 202 switchably connects the storage devices 112 between respective external storage interfaces 204 and an internal storage interface 206. The switch 202 may not individually switch the storage devices 112 between the external storage interfaces 204 and the internal storage interface 206. That is, the switch 202 may be able to switch all the storage devices 112 to the external storage interfaces 204, or all the devices 112 to the internal storage interface 206, as opposed to switching some storage devices 112 to their respective external storage interfaces 204 and other devices 112 to the internal storage interface 206.

The external storage interfaces 204 may each be considered a converter that converts the native interface of a respective storage device 112 to the interface with which the target port 108 is compatible. For example, if the storage devices 112 are Serial AT Attachment (SATA) drives and the target port 108 is a USB C port, then the external storage interfaces 204 may be semiconductor chips or other circuitry that convert between the SATA interface and the USB interface. The external storage interfaces 204 permit the storage devices 112 to be accessed at the target port 108 in the external storage access mode.

The internal storage interface 206 may be or include a chipset of the target computing device 104. A chipset is a set of electronic components that manages data flow among a processor 208, memory, the storage devices 112, and peripheral devices such as an internal display. The internal storage interface 206 may be in the form of a single-chip chipset, such as a Platform Controller Hub (PCH). The internal storage interface 206 permits the processor 208 and other internal hardware components of the target computing device 104 to access the storage devices 112 in the internal storage access mode.

The processor 208 can be the main or central processor of the target computing device 104. There may be more than one processor 208, and each processor 208 may include multiple processing cores. The processor 208 is powered when the target computing device 104 is fully operating, and may be powered down or enter a reduced-power state when the device 104 is not fully operating. When the target computing device 104 is fully operating, the processor 208 executes the operating system and associated applications, and in order to do so can access the storage devices 112.

The target computing device 104 can include a hub 210 if there is more than one storage device 112. If there is just one storage device 112, the hub 210 may not be present. The hub 210 may be a USB hub, for instance, and permits multiple storage devices 112 to be accessible at the same target port 108. The hub 210 thus interconnects the storage devices 112, via their respective external storage interfaces 204, to the target port 108.

The target computing device 104 includes power delivery (PD) circuitry 212, which may be in the form of one or multiple semiconductor chips. The PD circuitry 212 is able to communicate with the host computing device 102 via the target port 108 and is able to receive power from the device 102 via the port 108 for distribution to (i.e., to power) various components of the target computing device 104. For instance, the PD circuitry 212 can convey power to the storage devices 112, the switch 202, the external storage interfaces 204, and the hub 210. The PD circuitry 212 may switchably convey power to these components, in that the circuitry 212 can be controlled to provide power received at the target port 108 to the components or to not provide power received at the port 108 to the components.

The target computing device 104 includes firmware 214, which also receives power from the PD circuitry 212 as received at the target port 108, and which can communicate with the circuitry 212 as well. The firmware 214 includes firmware of or for the PD circuitry 212 (i.e., PD firmware), firmware of or for an embedded controller (EC) (i.e., EC firmware), as well as other firmware, such as a basic input/output system (BIOS). The EC refers to hardware that receives power and is running unless the target computing device 104 has no power (i.e., unless the target computing device 104 is in a G3 global power state).

The BIOS refers to hardware or hardware and instructions to initialize, control, or operate the target computing device 104, including prior to execution of an operating system of the device 104. Instructions included within the firmware 214 may be software, firmware, microcode, or other programming that defines or controls functionality or operation of the BIOS. As one example, the BIOS may be implemented using instructions, such as platform firmware of the target computing device 104, executable by the processor 208.

The BIOS may initialize, control, or operate components such as hardware components of the target computing device 104, and may load or boot the operating system of the device 104. The BIOS may provide or establish an interface between the hardware devices or platform firmware of the target computing device 104 and the operating system of the device 104. The operating system may control or operate the hardware devices or platform firmware via this interface. In some examples, the BIOS may implement the Unified Extensible Firmware Interface (UEFI) specification or another specification or standard for initializing, controlling, or operating the computing device 104.

The firmware 214 can indicate to the host computing device 102, via the PD circuitry 212 communicating with the device 102 at the target port 108, that the target computing device 104 is operable in the external storage access mode. The firmware 214 can similarly indicate to the host computing device 102 the amount of power that the target computing device 104 has to receive from the device 102 in order to operate in the external storage access mode, or that the device 104 already has power and does not need power from the device 104. The firmware 214 can switch the target computing device 104 between operation in the internal storage access mode and the external storage access mode by controlling the switch 202.

Figure 3:
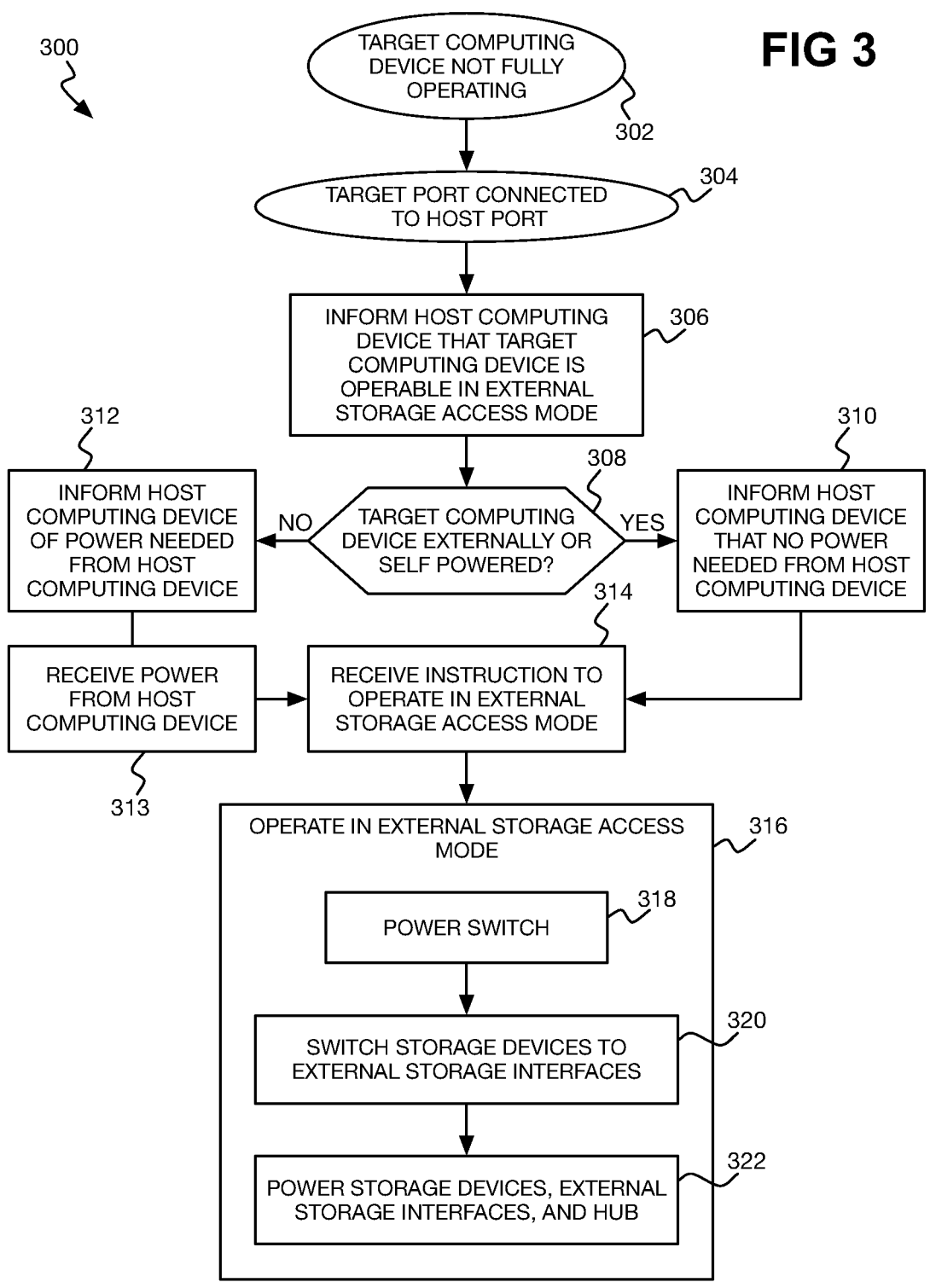
FIG. 3 is a flowchart of an example method executable by the target computing device of FIGS. 1 and 2 to operate the target computing device in an external storage access mode in which storage devices of the target computing device are accessible by a host computing device while the target computing device is not fully operating.

FIG. 3 shows an example method 300 for operating the target computing device 104 in the external storage access mode in which the storage devices 112 are accessible as external storage devices by the host computing device 102 when the device 104 is not fully operating. The method 300 can be implemented as program code stored on a non-transitory computer-readable data storage medium and executable by the target computing device 104, such as by or via the firmware 214 of the device 104. The method 300 is performed when the target computing device 104 is not fully operating (302).

The target port 108 of the target computing device 104 is connected to the host port 106 of a host computing device 102 that is currently on and which itself is fully operating (304). Upon this connection, the PD circuitry 212 may automatically be powered by power received at the target port 108 from the host computing device 102. The PD circuitry 212 may in turn automatically provide power received from the host computing device 102 at the target port 108 to the firmware 214 as well, in order for the firmware 214 to operate. The amount of power used by the PD circuitry 212 and the firmware 214 may be minimal, on the order of a watt or less, and may be automatically provided by the host computing device 102 as part of the USB specification apart from the USB PD specification.

The target computing device 104 informs the host computing device 102 that the device 104 is operable in the external storage access mode (306). For instance, the firmware 214 may indicate to the host computing device 102 via the target port 108 that the target computing device 104 is operable in the external storage access mode. The firmware 214 may provide this information in response to an inquiry made by the host computing device 102 in this respect.

If the target computing device 104 is externally and/or self powered (308), the device 104 may inform the host computing device 102 that the device 104 is able to operate in the external storage access mode without receiving any power from the device 102 (310). As noted above, the target computing device 104 may inform the host computing device 102 that the device 104 does not need any power from the device 102 to operate in the external storage access mode just if the device 104 is externally powered, regardless of whether the device 104 has battery power (i.e., is self powered). The firmware 214 may specifically provide this information to the host computing device 102 via the target port 108 in response to an inquiry made by the device 102 in this respect.

If the target computing device 104 is not externally and/or self powered (312), the device 104 may instead inform the host computing device 102 the amount of power that the device 104 needs from the device 102 in order to operate in the external storage access mode (312). This is the amount of power needed to operate the storage devices 112, the external storage interfaces 204, and the hub 210, and if provided by the host computing device 102, is provided via USB PD. Of these components, the storage devices 112 are likely to consume the vast majority of the power needed for the target computing device 104 to operate in the external storage access mode. The internal storage interface 206 and the processor 208, among other components (e.g., memory, internal display, and so on), are not powered in the external storage access mode. The firmware 214 may indicate the amount of power needed to the host computing device 102 via the target port 108 in response to an inquiry made by the device 102 in this respect.

In the case in which the target computing device 104 is not externally or self powered and assuming the device 104 receives the needed power from the host computing device 102 at the target port 108 (313), as well as in the case in which the device 104 does not need power from the device 102, the device 104 receives an instruction from the device 102 to operate in the external storage access mode (314). For example, the firmware 214 may receive this instruction via the target port 108. In response, the target computing device 104 operates in the external storage access mode (316). The target computing device 104 thus provides access to the storage devices 112 at the target port 108 to the host computing device 102, and the device 102 accesses the storage devices 112 at the host port 106 as external storage devices.

The target computing device 104 can operate in the external storage access mode as follows. The switch 202 is powered (318). For instance, the firmware 214 can control or otherwise cause the PD circuitry 212 to power the switch 202 from the power received from the host computing device 102 at the target port 108. The storage devices 112 are then switched to their respective external storage interfaces 204 (320). For instance, the firmware 214 can control or otherwise cause the switch 202 to connect the storage devices 112 to their respective external storage interfaces 204 (as opposed to the internal storage interface 206). The storage devices 112, the external storage interfaces 204, and the hub 210 (if present) are then powered (322). For instance, the firmware 214 can control or otherwise cause the PD circuitry 212 to power the storage devices 112, the external storage interfaces 204, and the hub 210 from the power received from the host computing device 102 at the target port 108.

Figure 4:
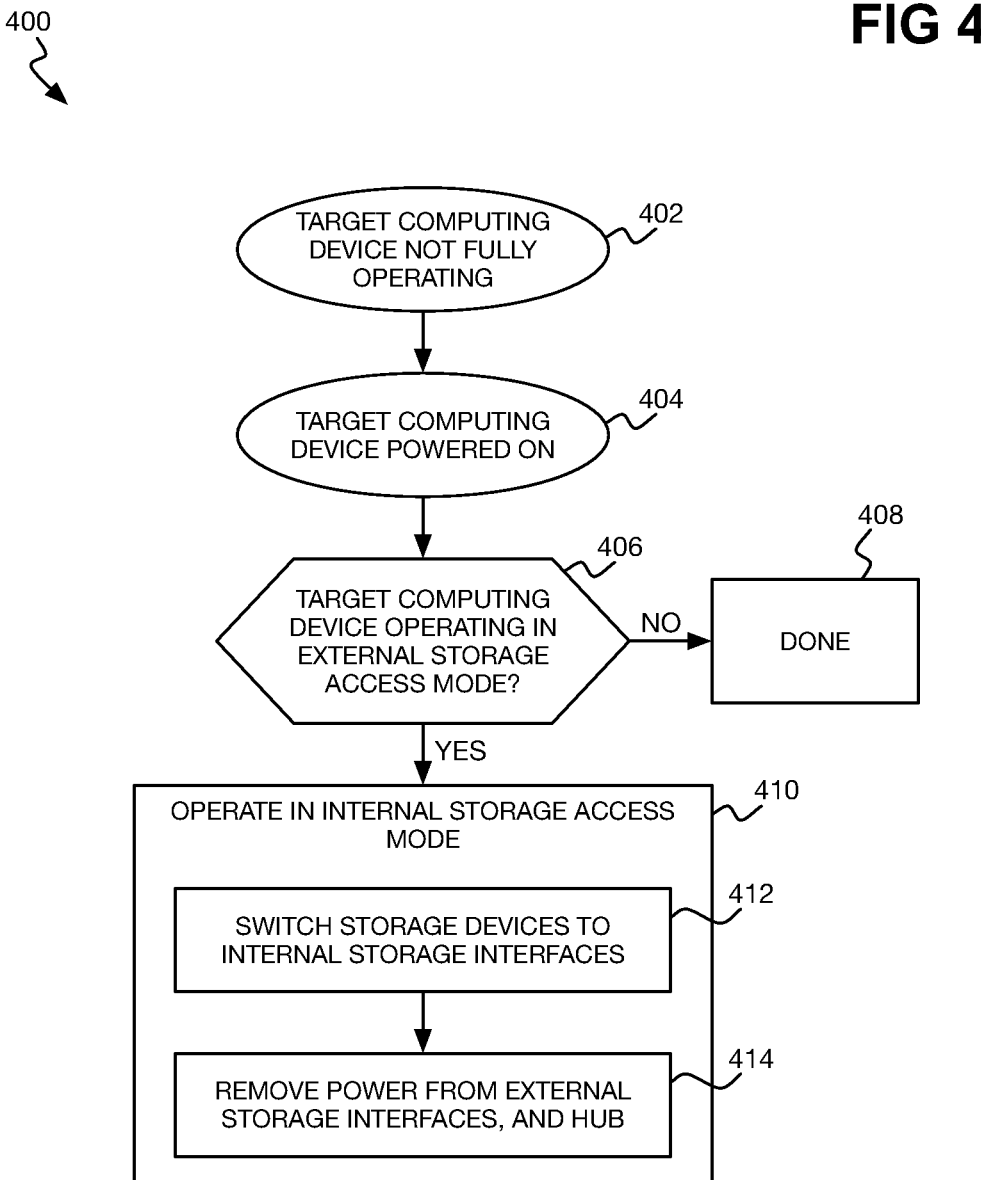
FIG. 4 is a flowchart of an example method executable by the target computing device of FIGS. 1 and 2 to switch operation to an internal storage access mode in which storage devices of the target computing device are internally accessible, responsive to the target computing device being powered on to cause it to fully operate.

FIG. 4 shows an example method 400 for operating the target computing device 104 in the internal storage access mode in which the storage devices 112 are internally accessible within the device 104 when the target computing device 104 has been powered on in order to fully operate. Like the method 300, the method 400 can be implemented as program code stored on a non-transitory computer-readable data storage medium and executable by the target computing device 104, such as by or via the firmware 214 of the device 104. The method 400 is performed when the target computing device 104 is not fully operating (402), but then is powered on so that the device 104 can fully operate (404), including booting or resumption of the operating system of the device 104 and execution of applications in conjunction with the operating system.

The firmware 214 may detect whether the target computing device 104 is currently operating in the external storage access mode (406). If the target computing device 104 is not operating in the external storage access mode, then the method 400 is finished (408). The target computing device 104 does not have to be transitioned from the internal storage access mode in this case because the device 104 is not currently operating in the external storage access mode. However, if the target computing device 104 is currently operating in the external storage access mode, then the device 104 operates in the internal storage access mode instead (410). The processor 208 can thus access the storage devices 112 via the internal storage interface 206.

The target computing device 104 can operate in the internal storage access mode as follows. The storage devices 112 are switched to the internal storage interface 206 (412). For instance, the firmware 214 can control or otherwise cause the switch 202 to connect the storage devices 112 to the internal storage interface 206. Power is then removed from the external storage interfaces 204 and the hub 210 if present (414). For instance, the firmware 214 can control or otherwise cause the PD circuitry 212 to no longer power to the external storage interfaces 204 and the hub 210, if power still continues to be received at the target port 108.

The firmware 214 does not have to control the PD circuitry 212 to provide power to the internal storage interface 206 or the processor 208 because these components receive power as a result of the target computing device 104 turning on, as opposed to receiving power provided at the target port 108. The firmware 214, the switch 202, and the storage devices 112 can receive power as a result of the target computing device 104 turning on, in addition to receiving power provided at the target port 108. Once the firmware 214, the switch 202, and the storage devices 112 receive power as result of the target computing device 104 turning on, they may automatically cease receiving power provided at the target port 108 if power is still being provided at the port 108.

The PD circuitry 212, the external storage interfaces 204, and the hub 210 may receive power just as provided at the target port 108. Therefore, once power is no longer provided at the target port 108, the PD circuitry 212, the external storage interfaces 204, and the hub 210 automatically have power removed therefrom. In one implementation, then, the target port 108 may be a port that is exclusive or dedicated to usage of the storage devices 112 in the external storage access mode of the target computing device 104, by the host computing device 102. The target port 108 in this case may not be usable by the target computing device 104 to connect to peripheral devices, such as external storage devices for the device 104 to access. The target computing device 104 may have other ports of the same type permitting such connection to peripheral devices, however.

Figure 5:
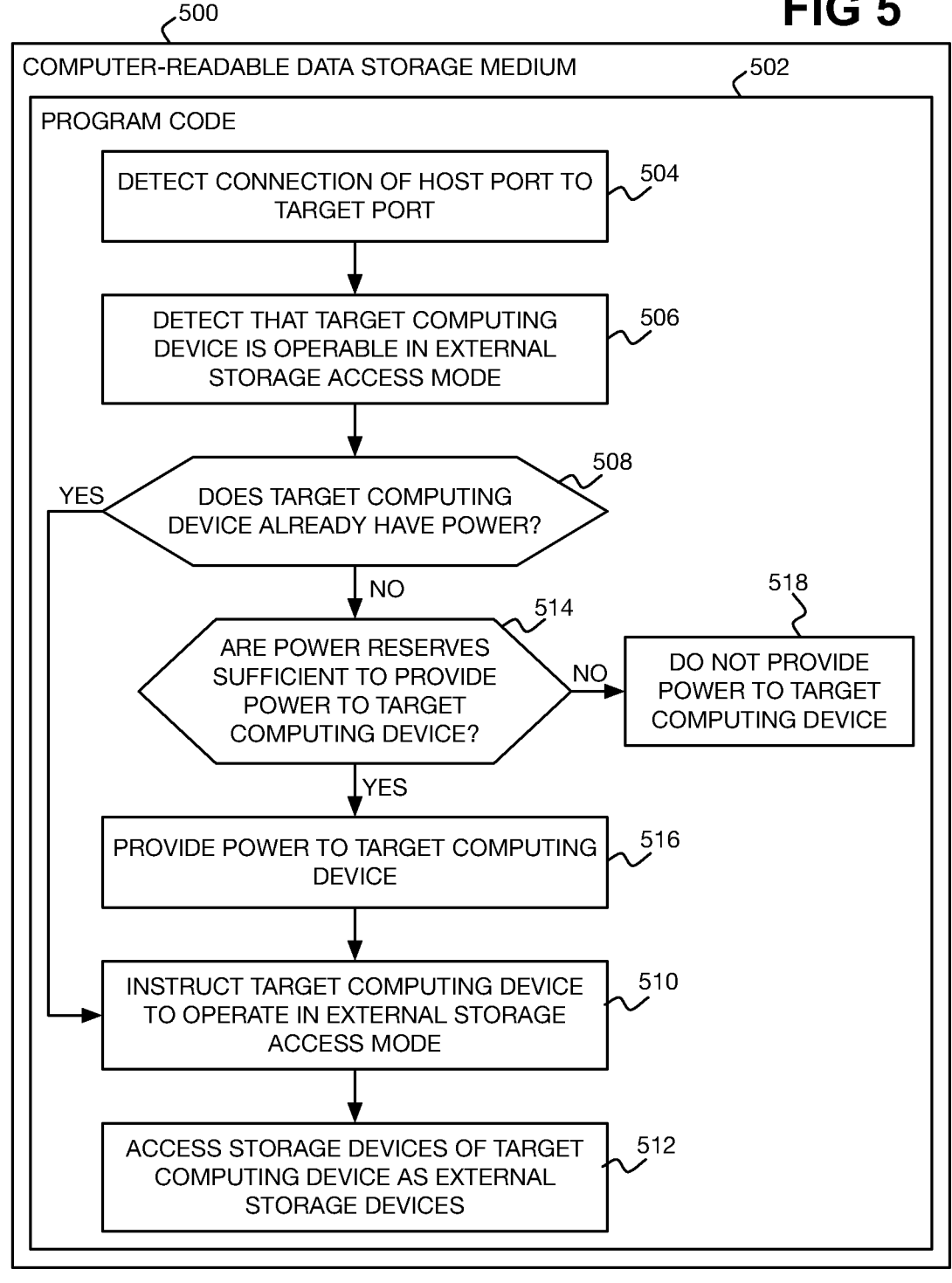
FIG. 5 is a diagram of an example non-transitory computer-readable data storage medium storing program code executable by the host computing device of FIG. 1 to access as external storage devices the storage devices of the target computing device, while the target computing device is not fully operating but is operating in an external storage access mode.

FIG. 5 shows an example non-transitory computer-readable data storage medium 500 storing program code 502 executable by the host computing device 102 to perform a method or processing to access the storage devices 112 of the target computing device 104 when the device 102 is not fully operating and is in the external storage access mode. The host computing device 102 detects connection of the host port 106 to the target port 108 when the target computing device 104 is not fully operating (504). The host computing device 102 detects that the target computing device 104 is operable in the external storage access mode (506). For instance, the host computing device 102 may send an appropriate inquiry to the target computing device 104, which responds to the device 102 per the 306 of FIG. 3.

The host computing device 102 determines whether the target computing device 104 already has power in order to operate in the external storage access mode (508). For instance, the host computing device 102 may send an appropriate inquiry to the target computing device 104, which responds to the device 104 per 310 of FIG. 3. If the target computing device 104 does not already have power to operate in the external storage access mode, the host computing device 102 determines whether the device 102 has power reserves sufficient to provide to the target computing device 104 to operate in the external storage access mode (514).

For instance, the host computing device 102 may send an inquiry to the target computing device 104 as to the amount of power that the device 104 needs to operate in the external storage access mode, and receive this information from the device 104 per part 312 of FIG. 3. The host computing device 102 may then determine if it has an amount of available power equal to or greater than the amount of power needed by the target computing device 104. If the host computing device 102 has insufficient power reserves to provide power to the target computing device 104, then the method or processing is finished (518). That is, the host computing device 102 refrains from providing any power to the target computing device 104 and requesting that the device 104 operate in the external storage access mode, and does not access the storage devices 112 of the device 104 as external storage devices.

Assuming that that the host computing device 102 has sufficient power reserves to provide to the target computing device 104 to operate in the external storage access mode, the device 102 provides power at the host port 106 to the target computing device 102 (516), such as via USB PD. Both in this case and in the case in which the target computing device 104 already has its own power sufficient to operate in the external storage access mode, the host computing device 102 then instructs the device 104 to operate in the external storage access mode (510). The target computing device 104 responsively operates in the external storage access mode, per part 316 of FIG. 3. The host computing device 102 can then access the storage devices 112 of the target computing device 104 at the host port 106 as external storage devices (512).

Techniques have been described for an external storage access mode in which the storage devices 112 of a target computing device 104 are accessible by a host computing device 102 without the device 104 fully operating and when the device 104 is not fully operating. When the target computing device 104 is fully operating, the storage devices 112 can be used normally—i.e., by an operating system and applications being executed by a processor 208 of the device 104. However, when the target computing device 104 is not fully operating, the storage devices 112 are accessible by the host computing device 102 as external storage devices, permitting data to be retrieved from and written to the storage devices 112 even though the device 104 is not fully operating.

We claim:

1. A non-transitory computer-readable data storage medium storing program code executable by a host computing device to perform processing comprising:

detecting connection of a host port of the host computing device to a target port of a target computing device that is not currently fully operating;

detecting that the target computing device is operable in an external storage access mode in which a storage device of the target computing device is externally accessible at the target port without the target computing device fully operating;

in response to the target computing device operating in the external storage access mode, accessing via the host port the storage device as an external storage device;

in response to detecting the connection of the host port to the target port, detecting that power reserves of the host computing device are sufficient to provide power to the target computing device via the host port to operate in the external storage access mode; and in response to detecting that the power reserves are sufficient and in response to detecting that the target computing device is operable in the external storage access mode, providing the power to the target computing device via the host port and instructing the target computing device to operate in the external storage access mode, the target computing device receiving the power and responsively operating in the external storage access mode.

2. The non-transitory computer-readable data storage medium of claim 1, wherein the processing further comprises:

in response to detecting the connection of the host port to the target port, detecting that the target computing device already has the power; and in response to detecting that the target computing device already has the power and in response to detecting that the target computing device is operable in the external storage access mode, instructing the target computing device to operate in the external storage access mode, the target computing device responsively operating in the external storage access mode.

3. The non-transitory computer-readable data storage medium of claim 1, wherein the processing further comprises:

in response to detecting the connection of the host port to the target port, detecting whether the target computing device already has the power; and in response to detecting that the target computing device already has the power, and in response to detecting that the target computing device is operable in the external storage access mode, instructing the target computing device to operate in the external storage access mode, the target computing device responsively operating in the external storage access mode; and in response to detecting that the target computing device does not already have the power, in response to detecting that the power reserves are sufficient, and in response to detecting that the target computing device is operable in the external storage access mode, providing the power to the target computing device via the host port and instructing the target computing device to operate in the external storage access mode, the target computing device receiving the power and responsively operating in the external storage access mode.

4. A method comprising:

connecting a target port of a target computing device that is not currently fully operating to a host port of a host computing device that is fully operating;

informing, by the target computing device, the host computing device that the target computing device is operational in an external storage access mode in which a storage device of the target computing device is externally accessible at the target port without the target computing device fully operating;

determining, by the host computing device, whether the power reserves of the host computing device are sufficient to provide power to the target computing device via the host port to operate in the external access mode; and in response to determining that the power reserves of the host computing device are sufficient to provide power to the target computing device:

providing, by the host computing device the power to the target computing device via the host port, and operating, by the target computing device, in the external storage access mode, the host computing device accessing via the host port the storage device as an external storage device.

5. The method of claim 4, further comprising:

informing, by the target computing device, the host computing device of power that the target computing device needs to operate in the external storage access mode; and receiving, by the target computing device, the power from the host computing device at the target port, wherein the target computing device is to operate in the external storage access mode both in response to receiving the power and in response to receiving an instruction from the host computing device to operate in the external storage access mode.

6. The method of claim 4, further comprising:

informing, by the target computing device, the host computing device that the target computing device does not need any power from the host computing device to operate in the external storage access mode, wherein the target computing device is to operate in the external storage access mode without receiving any power from the host computing device, in response to receiving an instruction from the host computing device to operate in the external storage access mode.

7. The method of claim 4, wherein operating in the external storage access mode comprises:

powering a switch of the target computing device that switches the storage device between connection to an external storage interface of the target computing device in the external storage access mode and connection to an internal storage interface of the target computing device in an internal storage access mode in which the storage device is internally accessible within the target computing device;

switching, via the switch, the storage device from the connection to the internal storage interface to the connection to the external storage interface; and powering the external storage interface and the storage device.

8. The method of claim 7, further comprising, when the target computing device is operating in the external storage access mode:

in response to the target computing device powering on to fully operate, operating, by the target computing device, in the internal storage access mode.

9. The method of claim 8, wherein operating in the internal storage access mode comprises:

switching, via the switch, the storage device from the connection to the external storage interface to the connection to the internal storage interface; and removing power from the external storage interface.

10. A target computing device comprising:

a storage device;

a target port to connect to a host port of a host computing device; and firmware to receive an instruction from the host computing device to operate the target computing device in an external storage access mode in which the storage device is externally accessible without the target computing device fully operating, the host computing device accessing via the host port the storage device as an external storage device, the host computing device sending the instruction in response to a determination regarding a power requirement to operate the target computing device in the external storage access mode.

11. The target computing device of claim 10, further comprising:

power delivery (PD) circuitry to power the firmware via power received at the target port from the host computing device or via power received from an external power source other than the host computing device;

a processor;

an internal storage interface by which the storage device is accessible to the processor;

an external storage interface by which the storage device is externally accessible at the target port; and a switch to switch the storage device between connection to the external storage interface in the external storage access mode and connection to the internal storage interface in an internal storage access mode in which the storage device is internally accessible within the target computing device by the processor.

12. The target computing device of claim 11, wherein the firmware is to operate the target computing device in the external storage access mode by:

powering the switch via the PD circuitry;

switching the storage device from the connection to the internal storage interface to the connection to the external storage interface, via the switch; and powering the external storage interface and the storage device via the PD circuitry.

13. The target computing device of claim 12, further comprising:

a hub interconnecting the external storage interface to the target port, wherein the firmware is to operate the target computing device in the external storage access mode by further powering the hub via the PD circuitry.

14. The target computing device of claim 12, wherein when the target computing device is operating in the external storage access mode, the firmware is to operate the target computing device in the internal storage access mode in response to the target computing device powering on to fully operate, by:

switching the storage device from the connection to the external storage interface to the connection to the internal storage interface, via the switch; and removing power from the external storage interface via the PD circuitry.

15. The non-transitory computer-readable storage medium of claim 1, wherein the processing further comprises determining that the target computing device is not currently fully operating when the target computing device is in a powered-down state or a reduced-power state.

16. The non-transitory computer-readable storage medium of claim 1, wherein the processing further comprises, in response to detecting that the power reserves are insufficient, refraining from providing the power to the target computing device via the host port and refraining from instructing the target computing device to operate in the external storage access mode, such that the storage device is not accessed via the host port.

17. The target computing device of claim 10, wherein the firmware is to indicate to the host computing device that the target computing device has its own power sufficient to meet the power requirement.

18. The target computing device of claim 10, wherein:

the firmware is to indicate to the host computing device the power requirement; and the determination includes determining that the host computing device has power reserves sufficient to meet the power requirement.

19. The target computing device of claim 18, wherein the firmware is to, in response to determining that the host computing device has power reserves sufficient to meet the power requirement, cause the target computing device to receive power from the host computing device.

* * * * *